US010377922B2

(12) United States Patent
Kim et al.

(10) Patent No.: US 10,377,922 B2
(45) Date of Patent: Aug. 13, 2019

(54) COMPOSITE DRY ADHESIVE AND METHODS OF MAKING AND USING A COMPOSITE DRY ADHESIVE

(71) Applicant: The Board of Trustees of the University of Illinois, Urbana, IL (US)

(72) Inventors: Seok Kim, Champaign, IL (US); Jeffrey D. Eisenhaure, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 783 days.

(21) Appl. No.: 14/831,058

(22) Filed: Aug. 20, 2015

(65) Prior Publication Data

US 2015/0359043 A1 Dec. 10, 2015

Related U.S. Application Data

(63) Continuation-in-part of application No. 14/732,143, filed on Jun. 5, 2015, now Pat. No. 10,046,353.

(60) Provisional application No. 62/039,743, filed on Aug. 20, 2014, provisional application No. 62/039,743, filed on Aug. 20, 2014, provisional application No. 62/008,773, filed on Jun. 6, 2014.

(51) Int. Cl.

| | |
|---|---|
| ***H05B 3/00*** | (2006.01) |
| ***C09J 7/02*** | (2006.01) |
| ***H05B 3/14*** | (2006.01) |
| ***H05B 3/06*** | (2006.01) |
| ***H05B 3/26*** | (2006.01) |
| ***H05B 3/38*** | (2006.01) |
| ***C09J 9/02*** | (2006.01) |
| ***C09J 11/08*** | (2006.01) |
| ***C09J 7/20*** | (2018.01) |

(52) U.S. Cl.

CPC . *C09J 7/02* (2013.01); *C09J 7/20* (2018.01); *C09J 9/02* (2013.01); *C09J 11/08* (2013.01); *H05B 3/06* (2013.01); *H05B 3/145* (2013.01); *H05B 3/267* (2013.01); *H05B 3/38* (2013.01); *C09J 2431/00* (2013.01); *C09J 2463/00* (2013.01); *C09J 2475/00* (2013.01); *H05B 2203/013* (2013.01); *H05B 2214/04* (2013.01)

(58) Field of Classification Search

None

See application file for complete search history.

(56) References Cited

U.S. PATENT DOCUMENTS

| | | | | |
|---|---|---|---|---|
| 5,889,118 A * | 3/1999 | Delgado | C08F 265/04 | 525/228 |
| 5,891,366 A * | 4/1999 | Gruenwald | C09J 9/02 | 156/272.8 |
| 6,773,535 B1 * | 8/2004 | Wetzel | B29C 65/76 | 156/247 |
| 8,057,891 B2 | 11/2011 | Cheng et al. | | |
| 8,093,340 B2 | 1/2012 | Xie et al. | | |
| 8,236,129 B2 | 8/2012 | Xie et al. | | |
| 8,237,324 B2 | 8/2012 | Pei et al. | | |
| 8,251,163 B2 | 8/2012 | Xie et al. | | |
| 8,586,176 B2 * | 11/2013 | Taya | B29C 61/0608 | 244/46 |
| 8,628,838 B2 | 1/2014 | Xie et al. | | |
| 8,685,528 B2 | 4/2014 | Xie et al. | | |
| 2005/0274455 A1 * | 12/2005 | Extrand | C09J 5/00 | 156/272.4 |
| 2008/0262188 A1 * | 10/2008 | Xie | C08G 59/42 | 528/98 |
| 2010/0123268 A1 | 5/2010 | Menard | | |
| 2010/0190011 A1 * | 7/2010 | Cheng | B32B 27/18 | 428/413 |
| 2010/0316845 A1 * | 12/2010 | Rule | B29C 61/0608 | 428/172 |
| 2012/0034407 A1 * | 2/2012 | Yamanaka | C09J 7/29 | 428/40.2 |
| 2013/0069275 A1 | 3/2013 | Menard et al. | | |
| 2014/0069578 A1 | 3/2014 | Xie et al. | | |
| 2014/0260237 A1 * | 9/2014 | Marion, III | F03G 7/065 | 60/528 |
| 2015/0352586 A1 * | 12/2015 | Kim | B05C 1/02 | 427/256 |

OTHER PUBLICATIONS

Marc Behl et al., "Shape Memory Polymers", materialstoday, Elsevier, vol. 10, No. 4, pp. 20-28 (Year: 2007).*

Scott Gibson Rauscher, thesis titled Testing and Analysis of Shape-Memory Polymers for Morphine Aircract Skin Application, Swanson School of Engineering, University of Pittsburg (Year: 2008).*

Jeffrey Eisenhaure, disseration titled "Shape Memory Polymers as Direct Contact Dry Adhesives for Transfer Printing and General Use", University of Illinois at Urbana-Champaign (Year: 2017).*

Jeffrey Eisenhaure et al., "An Internally Heated Shape Memory Polymer Dry Adhesive", Polymers, published Aug. 22, 2014, pp. 2274-2286 (Year: 2014).*

Spearing, S. M., "Materials Issues in Microelectromechanical Systems (MEMS)," *Acta Materialia*, 48 (2000) pp. 179-196.

Zhang, Yong et al., "Autonomous Robotic Pick-and-Place of Microobjects," *IEEE Transactions on Robotics*, 26, 1 (Feb. 2010), pp. 200-207.

Miyazaki, Hideki T. et al., "Adhesion of micrometer-sized polymer particles under a scanning electron microscope," *Journal of Applied Physics*, 88, 6 (Sep. 15, 2000), pp. 3330-3340.

Haliyo, D. Sinan et al., "Advanced applications using [mü]MAD, the adhesion based dynamic micro-manipulator," *Proceedings of the 2003 IEEE/ASME International Conference on Advanced Intelligent Mechatronics* (AIM 2003), pp. 880-885.

(Continued)

*Primary Examiner* — Anish P Desai

(74) *Attorney, Agent, or Firm* — Brinks Gilson & Lione

(57) ABSTRACT

A composite dry adhesive includes (a) an adhesive layer comprising a shape memory polymer and (b) a resistive heating layer comprising a shape memory polymer composite on the adhesive layer. The shape memory polymer composite includes conductive particles dispersed in a shape memory polymer matrix, where the conductive particles have a concentration sufficient to form a conductive path through the resistive heating layer.

4 Claims, 6 Drawing Sheets

(56) References Cited

OTHER PUBLICATIONS

Dechev, Nikolai et al., "Microassembly of 3-D Microstructures Using a Compliant, Passive Microgripper," *Journal of Microelectromechanical Systems*, 13, 2 (Apr. 2004), pp. 176-189.
Saito, Shigeki et al., "Non-impact deposition for electrostatic micromanipulation of a conductive particle by a single probe," *Journal of Micromechanics and Microengineering*, 18 (2008), 107001 (3 pp).
Fuchiwaki, Ohmi et al., "Multi-axial Micromanipulation Organized by Versatile Micro Robots and Micro Tweezers," *2008 IEEE International Conference on Robotics and Automation*, Pasadena, CA, USA, May 19-23, 2008, pp. 893-898.
Meitl, Matthew A. et al., "Transfer printing by kinetic control of adhesion to an elastomeric stamp," *Nature Materials*, 5 (Jan. 2006), pp. 33-38.
Carlson, Andrew et al., "Shear-enhanced adhesiveless transfer printing for use in deterministic materials assembly," *Applied Physics Letters*, 98 (2011), pp. 264104-1-264104-3.
Yang, Sang Yoon et al., "Elastomer Surfaces with Directionally Dependent Adhesion Strength and Their Use in Transfer Printing with Continuous Roll-to-Roll Applications," *Advanced Materials*, 24 (2012), pp. 2117-2122.
Saeidpourazar, Reza et al., "Laser-Driven Micro Transfer Placement of Prefabricated Microstructures," *Journal of Microelectromechanical Systems*, 21, 5 (Oct. 2012), pp. 1049-1058.
Carlson, Andrew et al., "Active, Programmable Elastomeric Surfaces with Tunable Adhesion for Deterministic Assembly by Transfer Printing," *Advanced Functional Materials*, 22 (2012), pp. 4476-4484.
Yang, Yumi et al., "Arrays of Silicon Micro / Nanostructures Formed in Suspended Configurations for Deterministic Assembly Using Flat and Roller-Type Stamps," *Small*, 7, 4 (2011), pp. 484-491.
Xie, Tao et al., "Facile tailoring of thermal transition temperatures of epoxy shape memory polymers," *Polymer*, 50 (2009), pp. 1852-1856.
Xie, Tao et al., "Self-Peeling Reversible Dry Adhesive System," *Chem. Mater.*, 20 (2008), pp. 2866-2868.
Wanka, Stefanie et al., "Measuring Adhesion Forces in Powder Collectives by Inertial Detachment," *Langmuir*, 29 (2013), pp. 16075-16083.
Zhang, Yong et al., "Micro-Masonry of MEMS Sensors and Actuators," *Journal of Microelectromechanical Systems*, 23, 2 (Apr. 2014), pp. 308-314.
Jeong, Jae-Woong et al., "Two-axis MEMS scanner with transfer-printed high-reflectivity, broadband monolithic silicon photonic crystal mirrors," *Optics Express*, 21, 11 (Jun. 3, 2013), pp. 13800-13809.
Saeidpourazar, Reza et al., "A prototype printer for laser driven micro-transfer printing," *Journal of Manufacturing Processes*, 14 (2012), pp. 416-424.
Keum, Hohyun et al., "Silicon micro-masonry using elastomeric stamps for three-dimensional microfabrication," *Journal of Micromechanics and Microengineering*, 22 (2012) 055018 (7 pp).
Kim, Seok et al., "Enhanced adhesion with pedestal-shaped elastomeric stamps for transfer printing," *Applied Physics Letters*, 100 (2012), pp. 171909-1-171909-4.
Mengüç, Yiğit et al., "Gecko-Inspired Controllable Adhesive Structures Applied to Micromanipulation," *Advanced Functional Materials*, 22 (2012) pp. 1246-1254.
Berger, M., "Microfabrication Inspired by Lego," *NanoWerk* (2013) pp. 1-3.
Eisenhaure, J., "Microstructured Shape Memory Polymer Surfaces with Reversible Dry Adhesion," *ACS Appl. Mater. Interfaces* 5 (2013) pp. 7714-7717.
Eisenhaure, J. et al., "Microstructured Shape Memory Polymer Surfaces with Reversible Adhesion," Presentation from International Mechanical Engineering Conference & Exposition (IMECE) in Houston, TX, Nov. 13, 2012, pp. 1-15.
Eisenhaure, J. et al., "Microstructured Shape Memory Polymer Surfaces with Reversible Adhesion," Presentation from Materials Research Society (MRS) Fall Meeting in Boston, MA, Nov. 28, 2012, pp. 1-11.
Eisenhaure, J. et al., "Aphid Foot Inspired Reversible Dry Adhesives," Abstract from 2012 MRS Fall Meeting in Boston, MA, Nov. 28, 2012, 1 page.
Eisenhaure, J. et al., "Micro-Structured Shape Memory Polymer Based Stamps with Controllable Adhesion," Abstract from ASME 2012 International Mechanical Engineering Congress & Exposition (IMECE) in Houston, TX, Nov. 9-15, 2012, 1 page.
Kim, S. et al., "Microstructured Elastomeric Surfaces with Reversible Adhesion and Examples of Their Use in Deterministic Assembly by Transfer Printing," *PNAS*, 107, 40 (2010) pp. 17095-17100.
Kim, S. et al., "Reversible Dry Micro-Fibrillar Adhesives with Thermally Controllable Adhesion," *Soft Matter*, 5 (2009) pp. 3689-3693.
Liu, C. et al., "Review of Progress in Shape-Memory Polymers," *J. Mater. Chem.*, 17 (2007) pp. 1543-1558.
Volk, B., "Characterization of Shape Memory Polymers," NASA Langley Research Centre, Texas A&M University (2005) 11 pages.

* cited by examiner 622
618

620,624
622
618

622
614,628

614, 628
618
630,632, 616

628, 614
606,608
632, 616

606,608
602a
634

606,608
634
602, 604

606, 608
602, 604
600

COMPOSITE DRY ADHESIVE AND METHODS OF MAKING AND USING A COMPOSITE DRY ADHESIVE

RELATED APPLICATIONS

The present patent document claims the benefit of priority under 35 U.S.C. § 119(e) to U.S. Provisional Patent Application No. 62/039,743, filed Aug. 20, 2014, and is a continuation-in-part of U.S. patent application Ser. No. 14/732,143, filed Jun. 5, 2015, which claims the benefit of priority under 35 U.S.C. § 119(e) to U.S. Provisional Patent Application No. 62/039,743, filed Aug. 20, 2014, and to U.S. Provisional Patent Application No. 62/008,773, filed Jun. 6, 2014. All of the foregoing patent applications are hereby incorporated by reference in their entirety.

FEDERALLY SPONSORED RESEARCH OR DEVELOPMENT

This invention was made with government support under contract number CMMI-1351370 awarded by the National Science Foundation. The government has certain rights in the invention.

TECHNICAL FIELD

The present disclosure is related generally to shape memory polymers and more particularly to dry adhesives comprising shape memory polymers.

BACKGROUND

Dry adhesion is the result of multiple attractive forces, including short-range intermolecular forces such as van der Waals' and longer range electrostatic forces, which occur between contacting materials. The total force generated between contacting materials is therefore directly related to the amount of area in intimate contact, as well as the chemical makeup of the mating surfaces. Substantial investments in the study and development of dry adhesives have been made in recent years, spurred in large part by the discovery of the exceptional adhesive capabilities of gecko lizards. The majority of this work has focused on the study of fibrillar or "hairy" dry adhesives, such as the naturally occurring gecko, and the development and characterization of artificial fibrillar systems meant to mimic those found naturally.

A compliant adhesive surface facilitates the creation of large adhesive contact area during initial contact (bonding). During loading, excessive compliance in the adhesive system may cause inadequate load sharing between contact points, leaving the interface susceptible to peeling failure. Therefore, strong adhesion may be generated by an adhesive surface that maximizes compliance normal to the mating surface during bonding, while also minimizing compliance in the direction of loading. Fibrillar structures may be one possible solution to this problem; the slender fibrillar structures maximize compliance at the microscale to generate a large contact area, while the underlying structure supplies adequate rigidity to suppress peeling. The large scale application of artificial fibrillar dry adhesives faces multiple significant challenges, however, most notably high fabrication costs and limited durability.

Alternative dry adhesive systems using similar principles of compliance control are thus being developed. For example, various researchers are investigating the use of phase-changing or smart materials, such as thermosensitive shape memory polymers (SMPs) for dry adhesive applications. A drawback to the use of thermosensitive functional materials is the need for a heat source to induce the temperature changes needed to transition between adhesive and non-adhesive states. An external heat source constitutes additional equipment cost and reduced flexibility of operation for the adhesive system, making the bonding process more complex and adding thermal mass, thus slowing the thermal response time of the functional material with a given power input.

BRIEF SUMMARY

Described herein is a composite dry adhesive system designed to enable internal heating of a shape memory polymer adhesive. Also described are methods of using and making the composite dry adhesive.

The composite dry adhesive includes (a) an adhesive layer comprising a shape memory polymer and (b) a resistive heating layer comprising a shape memory polymer composite on the adhesive layer. The shape memory polymer composite includes conductive particles dispersed in a shape memory polymer matrix, where the conductive particles have a concentration in the matrix sufficient to form a conductive path through the resistive heating layer.

The method of using the composite dry adhesive entails providing a composite dry adhesive that includes a resistive heating layer on an adhesive layer, where the resistive heating layer comprises a shape memory polymer composite and the adhesive layer comprises a shape memory polymer, and where the shape memory polymer composite includes conductive particles dispersed in a shape memory polymer matrix. An electrical current is flowed through the resistive heating layer to generate heat, thereby heating the shape memory polymer of the adhesive layer to a temperature above a glass transition temperature ($T_g$) thereof. During the heating, the adhesive layer is contacted with a surface of an object and a load is applied to the composite dry adhesive. The shape memory polymer deforms under the load to conform to the surface of the object and attain a deformed shape. The flow of electrical current through the resistive heating layer is halted, and the shape memory polymer cools to a temperature below the $T_g$, increasing in rigidity and fixing the deformed shape. Thus, the adhesive layer is reversibly attached to the object with an adhesion strength of at least about 10 N/cm$^2$ (0.1 MPa).

The method of making the composite dry adhesive entails depositing a first precursor on a first surface, where the first precursor comprises a mixture of a shape memory polymer precursor and conductive particles. The first precursor is cured to form a first shape memory polymer composite comprising the conductive particles dispersed in a first shape memory polymer matrix. A second precursor that comprises another shape memory polymer precursor is deposited on a second surface, and the second precursor is cured to form a shape memory polymer. The first shape memory composite is bonded to the shape memory polymer. A composite dry adhesive comprising a resistive heating layer on an adhesive layer is thus formed, where the resistive heating layer comprises the first shape memory polymer composite and the adhesive layer comprises the shape memory polymer.

DETAILED DESCRIPTION

A composite dry adhesive system that utilizes a shape memory polymer ("SMP") doped with conductive particles as a resistive heating layer to internally generate the heat required for activation of an SMP adhesive layer is described herein. The resistive heating layer may include localized contact regions containing increased amounts of conductive particles to minimize surface contact resistance to electrodes while maintaining sufficient bulk resistivity for heat generation. The composite dry adhesive can function on flat or curved surfaces. As discussed in the Examples below, a 25 mm wide by 45 mm long dry adhesive strip can be heated evenly from an applied voltage, and can easily hold a mass in excess of 6 kg when bonded to a spherical concave glass surface using light pressure at 75° C.

Figure 1:
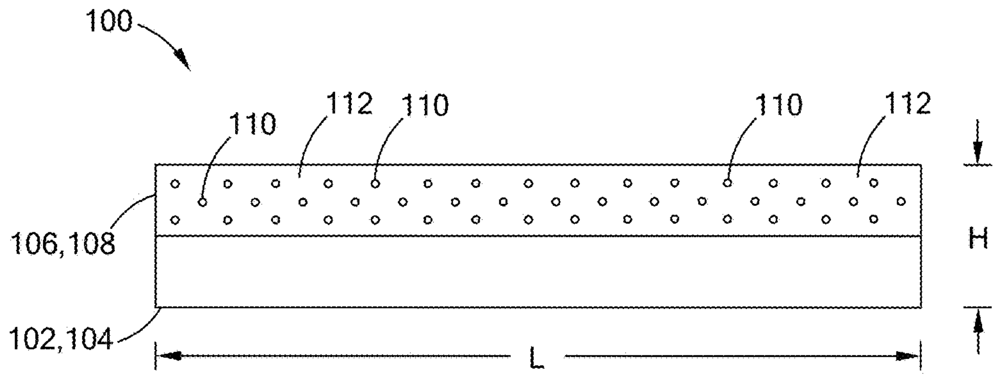
FIG. 1 is a schematic of an exemplary composite dry adhesive.

Referring to FIG. 1, the internally heated, thermosensitive composite dry adhesive 100 includes (a) an adhesive layer 102 comprising a shape memory polymer 104, and (b) a resistive heating layer 106 disposed on the adhesive layer 102. The resistive heating layer 106, which may also be referred to as a "conductive layer," comprises a shape memory polymer composite 108 that includes conductive particles 110 dispersed in a shape memory polymer matrix 112. The adhesive layer 102 comes into contact with and reversibly attaches to an object of interest, while the resistive heating layer 106 generates the heat needed for thermal activation of the shape memory polymer 104. Current may be supplied to the resistive heating layer 106 via electrical contacts formed by attaching conductive tape (e.g., copper tape) to opposing ends of the composite dry adhesive 100. The conductive particles 110 are included in the matrix 112 in an amount sufficient to form a conductive path through the resistive heating layer 106. The minimum concentration of conductive particles 110 required to form the conductive path may be referred to as the percolation threshold. Typically, the conductive particles 110 are included in the shape memory polymer matrix 112 at a concentration of at least about 1 wt. % or at least about 5 wt. %, which is believed to be greater than or equal to the percolation threshold.

A shape memory polymer has a cross-linking network that sets its permanent shape, which may be determined during an initial cure. At a particular temperature or range of temperatures, the shape memory polymer undergoes a thermal transition enabling short-range molecular motion. Above this temperature, the polymer becomes more compliant, and any deformation applied to the polymer may be subsequently fixed or "frozen" in place by cooling the SMP below its thermal transition temperature, which may be referred to as shape fixing. The SMP can maintain the deformed or temporary shape until again heated above its transition temperature, at which point it may return to its original permanent shape in a process that may be referred to as shape recovery. An advantage of the composite dry adhesive described herein is that the heat needed to change the rigidity (and thus the adhesion properties) of the shape memory polymer may be supplied internally.

Thus, as used herein, "shape memory polymer" refers to a polymer that comprises a deformable state above a glass transition temperature ($T_g$) thereof and a rigid state below the $T_g$. The glass transition temperature $T_g$ may encompass a single temperature or, more typically, a range of temperatures. Thus, the glass transition temperature $T_g$ may alternately be referred to as a glass transition temperature zone $T_g$. The change in storage modulus (or rigidity) of the shape memory polymer between the rigid state and the deformable state is at least about 10:1, and is more typically at least about 30:1, or at least about 100:1. Both the shape memory polymer of the adhesive layer and the shape memory polymer matrix of the resistive heating layer may be understood to be shape memory polymers.

Exemplary steps in a reversible adhesion process that utilizes the thermosensitive composite dry adhesive are described here.

Prior to attaching to an object of interest, the shape memory polymer (and thus the adhesive layer) may be in an initial, undeformed configuration that may be referred to as an "adhesion-off" configuration or state. Electrical current is flowed through the resistive heating layer, and heat is generated internally, enabling the shape memory polymer to be heated to a temperature above the $T_g$. The power per unit area generated from the resistive heating layer may be in the range from about 0.5 W/cm$^2$ to about 5 W/cm$^2$.

During the current flow, the adhesive layer is brought into contact with a surface of an object of interest, and a load (typically in the range of from about 1 N/cm$^2$ to about 50 N/cm$^2$) is applied to the composite dry adhesive. The shape memory polymer deforms in response to the load and conforms to the surface of the object, thereby attaining a deformed shape or configuration. The electrical current flow is then halted, and the shape memory polymer cools to a temperature below the $T_g$. As a consequence, the rigidity of the shape memory polymer increases and the deformed configuration is effectively "locked in" or stabilized, creating an "adhesion-on" configuration. The adhesive layer is thereby reversibly attached to the object with an adhesion strength of at least about 10 N/cm$^2$ (0.1 MPa).

The applied load may be removed or reduced and the composite dry adhesive may be moved (e.g., translated, rotated) along with the object to a predetermined location, if desired. The reversible adhesion process may include lift, transport, and/or placement steps to move the object from a first location to a second location. The composite dry adhesive may be attached to a computer-controlled micropositioner for implementing the translational and/or rotational motion of the composite dry adhesive and the bonded object.

In some cases, the adhesion capacity of the composite dry adhesive is at least about 100 N/cm$^2$ (1 MPa), or at least about 300 N/cm$^2$ (3 MPa), and the adhesion capacity may also be as high as about 500 N/cm$^2$ (5 MPa). The adhesion capacity referred to here may be understood to be the adhesion capacity of the composite dry adhesive with respect to an object at temperatures below $T_g$. The object may comprise a polymer, metal, alloy, ceramic, and/or semiconductor.

When the composite dry adhesive is heated again to a temperature above $T_g$, the shape memory polymer loses rigidity and may recover the initial, adhesion-off configuration. The composite dry adhesive may be removed (e.g., peeled) from the object. It is also possible to design the adhesive layer to facilitate automatic release of the object. For example, the adhesive layer may be designed to contact the object at no more than a few small contact points once the shape memory polymer has returned to its initial, adhesion-off state, allowing for release of the object. Accordingly, the adhesive layer may include one or more protruding structures, such as those described in U.S. patent application Ser. No. 14/732,143, filed Jun. 5, 2015, which was incorporated by reference in its entirety above. The one or more protruding structures may have a total contact area with the object of interest of no more than about 25% of the area of the surface of the adhesive layer. Thus, when the shape memory polymer returns to its adhesion-off state, the contact area between the adhesive layer and the object may decrease, and the object may be released.

The method may be carried out with any embodiment of the composite dry adhesive described herein.

Shape memory polymers suitable for the composite dry adhesive preferably undergo a large change in rigidity and a strong shape memory effect over a well-defined glass transition temperature range. As discussed above, the change in storage modulus (or rigidity) of the shape memory polymer between the rigid state and the deformable state may be at least about 10:1, and is more typically at least about 30:1, or at least about 100:1. The control over adhesion is substantially time-independent since the rigidity and shape of the shape memory polymer are determined by temperature. Suitable shape memory polymers may be based on epoxy, polyurethane, and/or (poly)ethylene-co-vinyl acetate (EVA), such as NGDE2, an epoxy-based shape memory polymer, which can be fabricated as described below. The shape memory polymer may have a $T_g$ in the range of from about 0° C. to about 300° C., although more typically the $T_g$ is above room temperature. For example, the $T_g$ may be from about 30° C. to 70° C., or from about 40° C. to 60° C. The shape memory polymer used for the adhesive layer advantageously has similar if not identical thermal expansion properties (e.g., coefficient of thermal expansion) to the shape memory polymer matrix employed for the resistive heating layer; thus, it is preferred but not required that the shape memory polymer and the shape memory polymer matrix have the same composition. Accordingly, throughout this disclosure, the shape memory polymer of the adhesive layer and the shape memory polymer matrix of the resistive heating layer may be referred to as collectively as "the shape memory polymer."

A resistive heating element may be attached to or embedded within the shape memory polymer. The resistive heating element may comprise any of a number of conductive materials, including metals, alloys, carbon and/or conductive oxides. For example, the resistive heating element may comprise a nickel-chromium alloy or indium-tin oxide (ITO). Depending on the material used for fabrication, the resistive heating element may be optically transparent, such as when ITO is employed. In this case, the resistive heating element may take the form of a transparent, conductive layer. The resistive heating element may alternatively comprise a nickel-chromium wire. The resistive heating element may also or alternatively comprise the resistive heating layer described herein, which includes the shape memory polymer composite.

The conductive particles may comprise an electrically conductive material such as a metal and/or carbon. Carbon particles suitable for dispersion in the shape memory polymer may take the form of carbon black, carbon nanoparticles, carbon nanotubes, or carbon fibers, for example. Suitable metals may include silver, gold, platinum, titanium and aluminum. As indicated above, the amount or concentration of the conductive particles is greater than or equal to the percolation threshold of the particles in the shape memory polymer matrix. Typically, the conductive particles are dispersed in the shape memory polymer matrix at a concentration of at least about 1 wt. %, at least about 5 wt. %, or at least about 10 wt. %, and typically no higher than about 30 wt. %. The conductive particles may be homogeneously or inhomogeneously dispersed in the shape memory polymer matrix. Suitable conductive particles may have an average particle size in the range of from about 1 nm to about 100 microns, and more typically from about 10 nm to about 10 microns, or from about 100 nm to about 1 micron. A shape memory polymer that is said to be "doped" with conductive particles may be understood to have the conductive particles dispersed therein, homogeneously or unhomogeneously.

The conductive particles are typically mechanically mixed with a shape memory polymer precursor followed by curing in order to form the shape memory polymer composite, as described in the Examples below. Practically speaking, beyond a concentration of about 30 wt. % conductive particles, the viscosity of the shape memory polymer precursor may be detrimentally increased, and the formulation may be susceptible to crack formation during curing.

Figure 2:
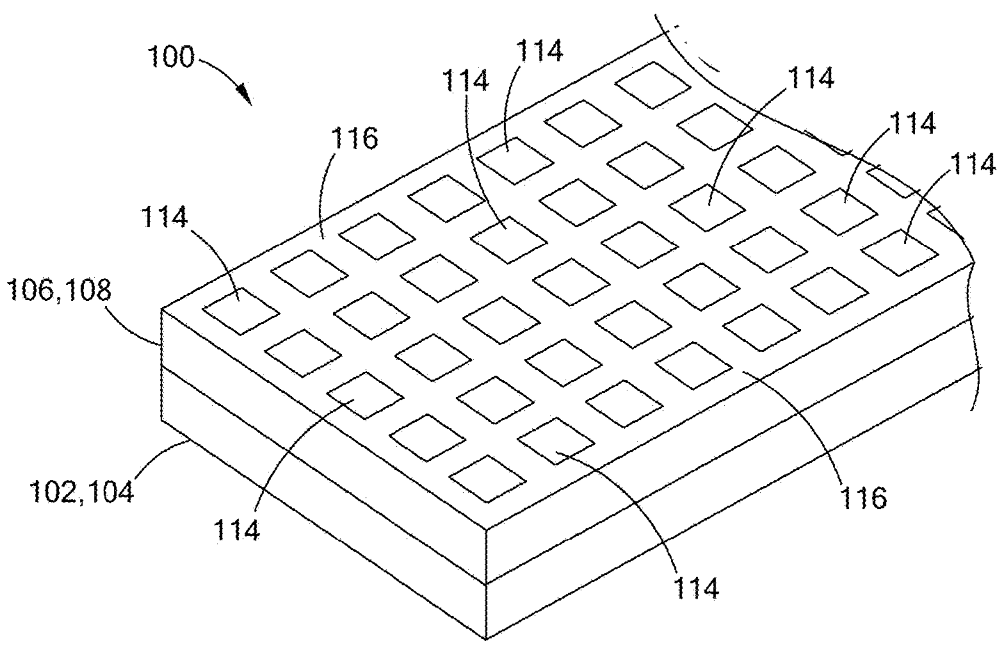
FIG. 2 is a schematic of an exemplary composite dry adhesive having a resistive heating (conductive) layer that includes isolated contact regions in a continuous resistive region.

Referring to FIG. 2, the resistive heating layer 106 of the internally heated thermosensitive composite dry adhesive 100 may include one or more isolated contact regions 114 and a continuous resistive region 116. The one or more isolated contact regions 114 may include the conductive particles 110 at a higher concentration than does the continuous resistive region 116, such as up to 1.5 times higher, up to 2 times higher, up to 2.5 times higher, or up to 3 times higher. In one example, the one or more isolated contact regions 114 may contain from about 25 wt. % to about 30 wt. % conductive particles 110, and the continuous resistive region 116 may contain from about 10 wt. % to about 20 wt. % conductive particles 110. The isolated contact region(s) 114 may extend through the thickness of the resistive heating layer 106 and may be surrounded by the continuous resistive region 116 in the plane of the layer 106. The isolated contact region(s) 114 may improve the electrical connection between the resistive heating layer 106 and the electrical contacts, while the continuous resistive region 116 provides a path for current flow and heat dissipation. As shown in FIG. 2, the resistive heating layer 106 may include a plurality of the contact regions 114 separated by the continuous resistive region 116. For example, the resistive heating layer 106 may include from 1 to 1000 contact regions 114, or more typically from 5 to 500 contact regions 114.

An advantage of the composite dry adhesive is its conformability to curved surfaces. This flexibility may be attributed at least in part to the low aspect ratio (AR) of the composite dry adhesive, where the aspect ratio is defined as the ratio of the height or thickness (H) of the composite dry adhesive compared to its length (L), i.e., AR=H/L. The length of the composite dry adhesive may be on the order of centimeters or larger (e.g., from about 2 cm to about 10 cm), while the height or thickness of the composite dry adhesive may be on the order of millimeters (e.g., from about 2 mm (0.2 cm) to about 5 mm (0.5 cm)). Advantageously, the composite dry adhesive may have an aspect ratio of no greater than about 0.3, no greater than about 0.2, or no greater than about 0.1.

Figures 6A, 6B, 6C, 6D, 6E, 6F, 6G, 6H:
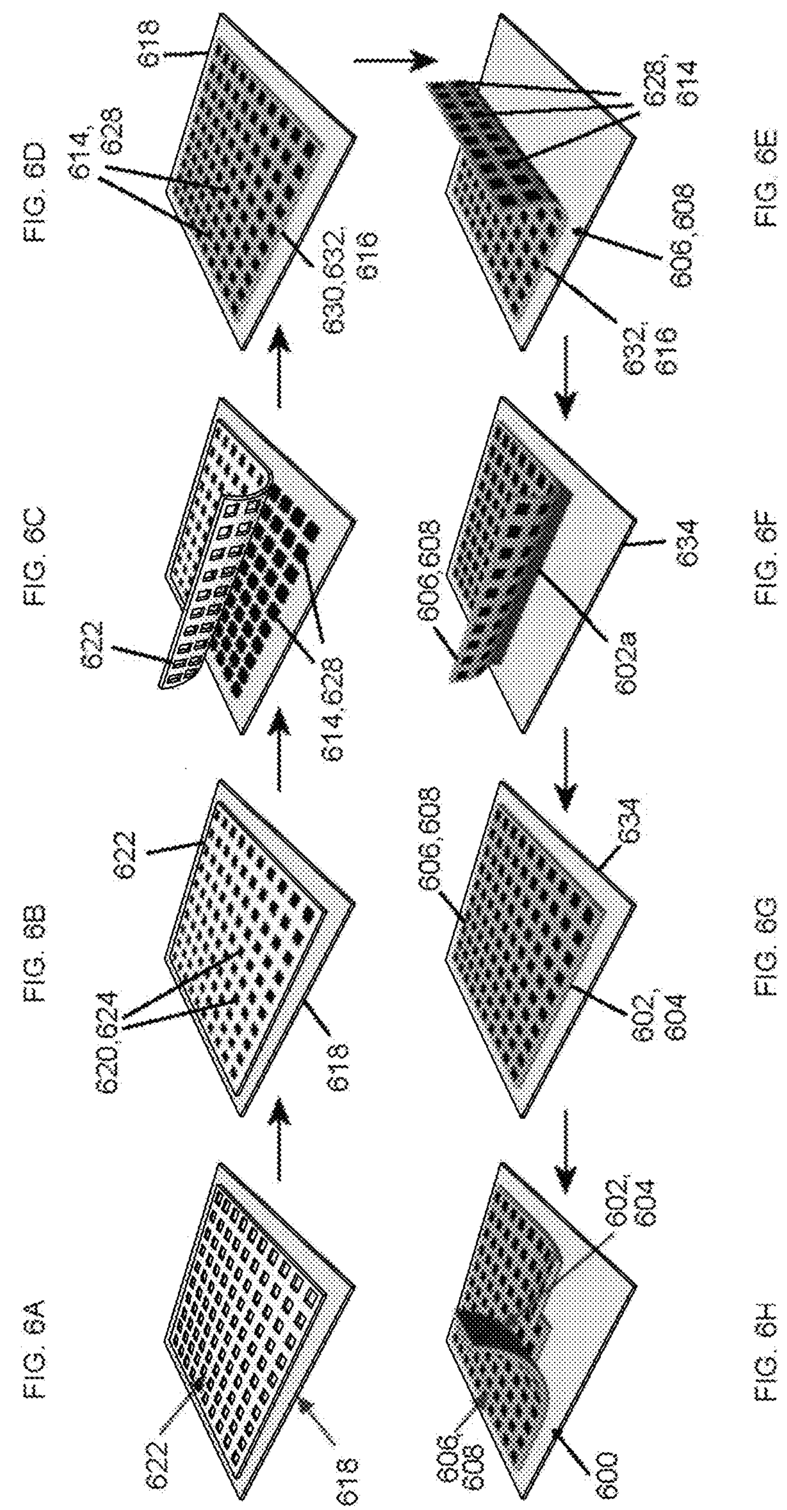
FIGS. 6A-6H show exemplary steps in fabricating a composite dry adhesive.
Figures 7A, 7B, 7C:
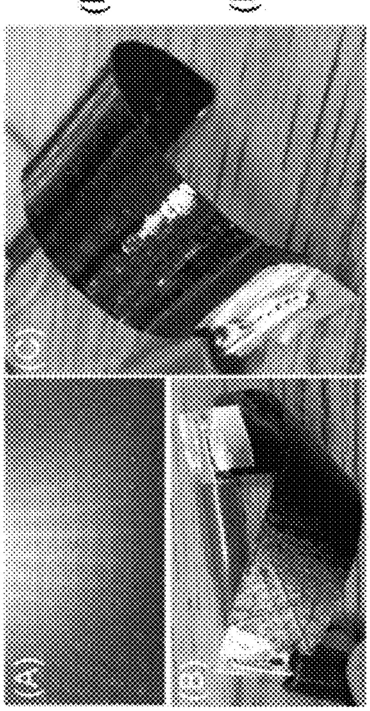
FIG. 7A shows a composite dry adhesive having a resistive heating layer that includes isolated contact regions surrounded by a continuous resistive region. The isolated contact regions include a shape memory polymer composite doped with 30 wt. % carbon black and the continuous resistive region includes a shape memory polymer composite doped with 15 wt. % carbon black.
FIG. 7B shows a strip of the composite dry adhesive that is internally heated above its $T_g$ and deformed.
FIG. 7C shows that the composite dry adhesive can maintain its deformed shape when cooled due to its shape fixing property.
Figures 7D, 7E:
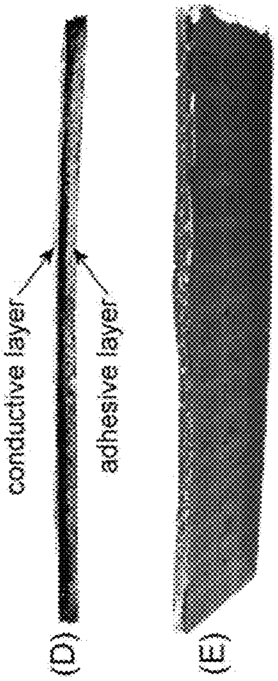
FIG. 7D show a side view of a composite dry adhesive having a resistive heating (conductive) layer on an adhesive layer.
FIG. 7E shows a view of the resistive heating layer.

The fabrication of the thermosensitive composite dry adhesive is described in general here and in more detail in the following examples. The fabrication method entails depositing a first precursor on a first surface, where the first precursor comprises a mixture of a shape memory polymer precursor and conductive particles. In some cases, as described below in reference to FIGS. 6A-6E, the first precursor 620 may be deposited as a plurality of precursor regions 624 in a mold 622 on the first surface 618. Alternatively, the first precursor may be deposited as a substantially uniform sheet on the first surface 618. The first precursor is then cured to form a first shape memory polymer composite 608 comprising the conductive particles dispersed in a first shape memory polymer matrix. Referring to FIG. 6F, a second precursor **602*a* that comprises another shape memory polymer precursor is deposited on a second surface 634. In some cases, as shown in FIGS. 6E-6G, the first shape memory polymer composite 608 is removed from the first surface 618 and is pressed onto the second precursor 602*a* on the second surface 634. The first surface 618 and the second surface 634 may be the same or different surfaces. The second precursor 602*a* is then cured to form a shape memory polymer 604, and a bond is created between the first shape memory polymer composite 608 and the shape memory polymer 604**.

A composite dry adhesive 600 comprising a resistive heating layer 606 on an adhesive layer 602 is thus formed from the first shape memory polymer composite 608 and the shape memory polymer 604, where the resistive heating layer 606 comprises the first shape memory polymer composite 608 and the adhesive layer 602 comprises the shape memory polymer 604. The composite dry adhesive 600 may be cut to the desired size and shape for use, as shown in FIG. 6H. As discussed above, schematics of the composite dry adhesive 600 are also provided in FIGS. 1 and 2 using reference numbers 1XX instead of 6XX (e.g., 100 in place of 600, 106 in place of 606, 114 in place of 614, etc.).

In one example referred to above, prior to curing the second precursor **602*a* to form the shape memory polymer 604, the first shape memory polymer composite 608 is removed from the first surface 618 and pressed onto the second precursor 602*a* on the second surface 634, as shown in FIGS. 6F-6G. Upon curing the second precursor 602*a*, the first shape memory polymer composite 608 bonds to the shape memory polymer 604**.

In another example, after curing the second precursor to form the shape memory polymer, a shape memory polymer precursor layer is placed between the first shape memory polymer composite and the shape memory polymer. The shape memory polymer precursor layer is cured to create the bond between the first shape memory polymer composite and the shape memory polymer.

In some cases, referring again to FIGS. 6A-6C, the first precursor 620 is separated on the first surface 618 by a grid-shaped mold 622 into one or more precursor regions 624. Thus, curing the first precursor 620 may comprise forming, from the one or more precursor regions 624, one or more isolated contact regions 614 comprising the first shape memory polymer composite 628. The method may further entail removing the grid-shaped mold 622 and surrounding the one or more isolated contact regions 614 with a third precursor 630 that comprises a mixture of the shape memory polymer precursor and the conductive particles, where the conductive particles are included in the mixture at a lower concentration than in the first shape memory polymer composite 628. This is illustrated in FIG. 6D. The third precursor 630 may be cured to form a second shape memory polymer composite 632 comprising the conductive particles dispersed in a second shape memory polymer matrix. The second shape memory polymer composite 632 forms a continuous resistive region 616 surrounding the one or more isolated contact regions 614, where the one or more isolated contact regions 614 contain the conductive particles at a first concentration and the continuous resistive region 616 contains the conductive particles at a second concentration lower than the first concentration. The resistive heating layer 606 thus comprises the first and second shape memory polymer composites 628,632. Typically, the curing described above is carried out at a temperature of from about 60° C. to about 130° C.

EXAMPLES

1. Materials and Formulations

In these examples, a SMP formulation developed by Xie and Rousseau and referred to as "NGDE2" is employed.

This particular formulation serves as the basis of the composite dry adhesive system demonstrated here. The epoxy-based SMP used for this work is created from a 1:1:1 molar ratio of EPON 826 (the diglycidyl ether of bisphenol A epoxy monomer; Momentive, Columbus, Ohio, USA), Jeffamine D230 (poly(propylene glycol)bis(2-aminopropyl) ether; Huntsman Corporation, The Woodlands, Tex., USA), and NGDE (neopentyl glycol diglycidyl ether; TCI America, New York, N.Y., USA). Prior to mixing, the EPON 826 is heated at 60° C. for 30 min to remove any crystallization.

Carbon black VULCAN XC72R supplied by Cabot Corporation (Boston, Mass., USA) is used for all CB/SMP blends. Molds for dynamic mechanical analysis (DMA) and transmission line model (TLM) test samples and for composite CB/SMP fabrication were created using a Formiga P 100 selective laser sintering system (EOS, Andrä-Wördern, Austria) with material PA 2200, polyamide white.

2. Shape Memory Composite Precursor Preparation

The constituents of CB/SMP precursors or blends are proportioned by weight and mixed manually using a stirring rod. The SMP mixture is prepared prior to adding the CB. The base SMP precursor is a somewhat viscous liquid but is thickened considerably by the addition of CB. Blends containing greater than 10 wt. % CB tend to become pastes, while exceeding 25 wt. % CB may result in a thick, clumpy mixture that is manually packed into molds to form the desired shapes. This is accomplished by shearing the mixture over the surface of the molds using a clean razor blade. The 5 wt. % CB blends were observed to have many larger voids formed by bubbles trapped during the mixing process.

This sometimes lead to fragile specimens. This issue was less prevalent at 10 wt. %, since the mixture thickened enough that the small trapped bubbles were no longer able to expand during curing.

3. Resistive Heating Layer Design

The resistive heating layer may include contact regions (or "islands") separated by a continuous resistive region, which may also be referred to as a filler region. In this example, the contact regions are fabricated with 30 wt. % CB and the filler regions contain 15 wt. % CB. The islands are 3.5×3.5 mm on the electrical contact side, tapering to 3×3 mm on the opposing side for easier release from the mold in which they are cured. The thickness of the resistive heating layer (or the conductive layer) is about 1 mm. The center-to-center spacing between adjacent islands is 5 mm. This design provides a roughly even distribution of the two CB/SMP blends exposed on the electrical contact surface.

4. Transmission Line Model (TLM) Test Measurements

Figure 3A:
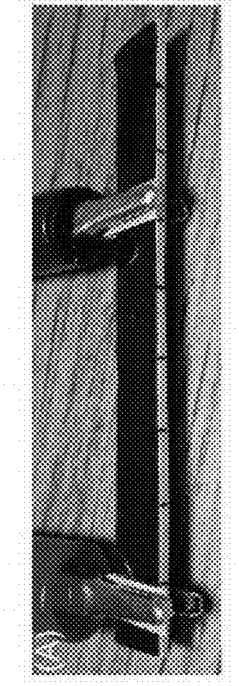
FIGS. 3A-3B show the collection of transmission line model (TLM) data using the steel clip method (3A) and the Cu tape method (3B). The steel clip method yields more consistent data for mixtures with low weight percentages of carbon black (CB).
Figure 3B:
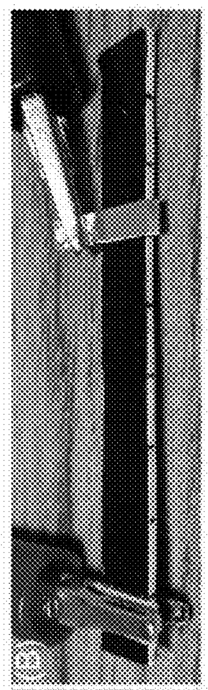

Carbon black or other conductive particles may be employed as an additive to confer electrical conductivity to the shape memory polymer. The critical concentration of conductive particles necessary to enable conductivity in an insulating polymer is called the percolation threshold, as described above, and is dependent on a variety of factors, including the type of conductive particle used, the polymer chemistry, and the method of mixing. Using the relatively common furnace black variety of carbon black, the percolation threshold generally occurs at concentrations below 5 wt. %. For this reason, electrical characterization of the CB/SMP blends begins at 5 wt. % CB and extends to 30 wt. % CB. The transmission line model (TLM) method is used to characterize the electrical properties, with two variations of the contact method used as shown in FIGS. 3A-3B. To use the CB/SMP blends in a dry adhesive system, it is desirable to have an easy contact method to one side of a strip of material, leaving the entirety of the opposing face as a continuous adhesive surface. The natural choice is to use an electrically conductive copper tape that may be pressed to the surface as the method of creating an electrical contact that will be flexible and removable, yet will remain in place while the adhesive is being handled. TLM measurements using Cu tape as the contact path were difficult with blends below approximately 25 wt. % CB due to a large and highly variable contact resistance. This may be due to an uneven surface distribution of CB in blends with a lower CB concentration, as well as some variation and viscous flow within the Cu tape's conductive sticky layer after application. For this reason, bulk resistivity was calculated using alligator clips squeezing flat steel plates against the CB/SMP blend surface as the contact points with which to make TLM resistance measurements, as shown in FIG. 3A. Surface resistivity of the CB/SMP blends to Cu tape could then be more confidently calculated down to 15 wt. %, using the configuration shown in FIG. 3B.

TLM measurements were collected at 1 cm increments, stepping along the length of the CB/SMP samples, which had 2 mm×10 mm cross sections, and using steel or Cu tape contact pads that are 5 mm×10 mm in area. The data were slightly corrected to minimize the effect of variable contact resistance between contact points prior to the calculation of the least-squares regression line.

5. Dynamic Mechanical Analysis (DMA) Test Measurements

All dynamic mechanical analysis (DMA) testing was performed using a Q800 DMA from TA Instruments (New Castle, Del., USA), with an attached gas cooling accessory (GCA) to test below room temperature. SMP and CB/SMP samples 5 mm wide, 1.5 mm to 2.1 mm thick, and at least 35 mm long were clamped in a tensile configuration for temperature step/frequency sweep testing. Across the glass transition range, measurements were taken at 2° C. intervals, with 4° C. intervals used away from $T_g$. The reported data was gathered at 1 Hz excitation with a 0.05% strain amplitude. Testing blends containing above 20 wt. % CB was prohibitively difficult due to the tendency for sample fracture during the course of the test.

6. Data Analysis

Figure 4A:
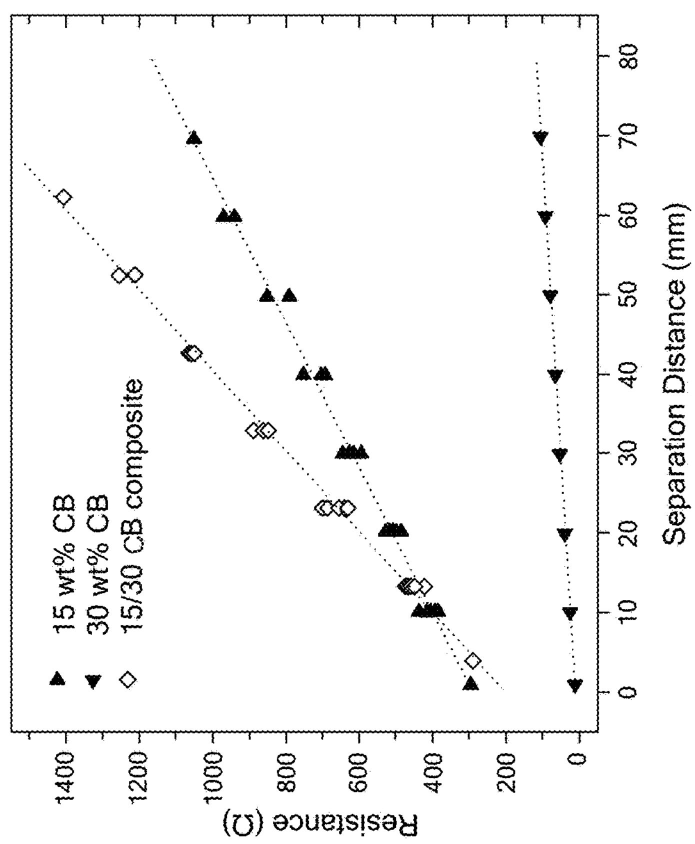
FIG. 4A shows resistance versus separation distance as determined using the steel clip method for homogeneous 15 and 30 wt. % CB/shape memory polymer (SMP) blends, and the 15/30 CB composite design. Linear curve fits used to calculate effective bulk and contact resistivities are shown.
Figure 4B:
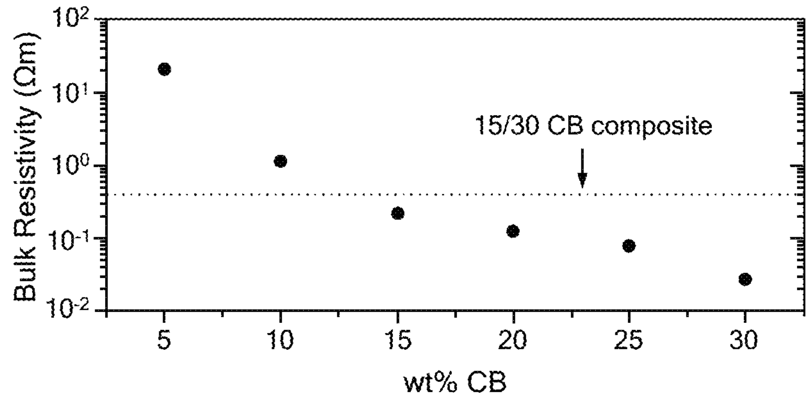
FIGS. 4B-4C show bulk resistivity and contact resistivity versus wt. % carbon black, respectively. The data indicate that the 15/30 CB composite has a relatively high effective bulk resistivity and a relatively low effective contact resistance, shifting the power dissipation into the bulk of the material for more even heating when using Cu tape as electrical contacts.
Figure 4C:
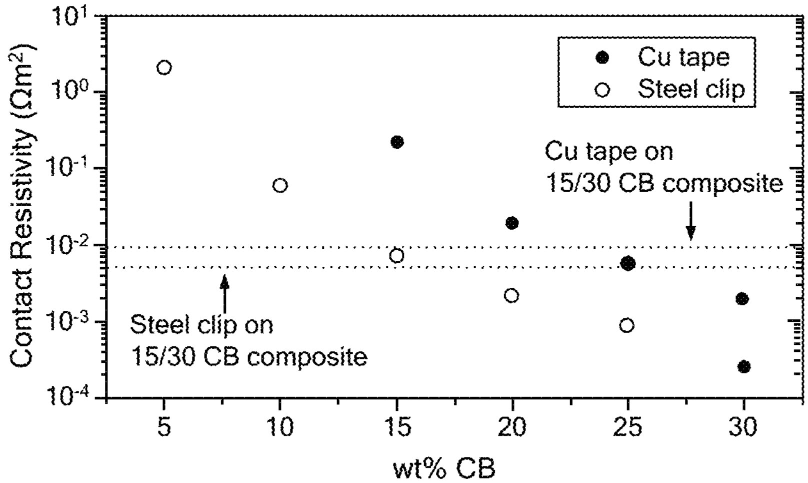

Examples of TLM curves for CB/SMP blends of 15 wt. % CB and 30 wt. % CB are shown in FIG. 4A for samples with a 20 $mm^2$ cross section, with contact pads that are 50 $mm^2$ in area. The 15/30 CB composite curve shown in the figure is addressed below. Above 20 wt. % CB, the CB/SMP blends tend to become thick, even clumpy, prior to curing and may form significant cracks at free surfaces while curing. Tensile strength is expected to decrease with increasing CB loading as a consequence of internal and surface cracks. Measurements terminate at 30 wt. % CB due to the practical challenges of manufacturing and handling continuous bars above this CB concentration. Bulk and contact resistivities are calculated based upon a least-squares regression line of the TLM data, together with the sample and contact pad geometries. A greater slope to the regression line indicates a larger bulk resistivity, while a greater y-intercept indicates a larger contact resistance. Performing similar measurements for several CB/SMP blends provides bulk and contact resistivities as a function of CB wt. % in FIGS. 4B and 4C, respectively. The calculation of contact resistivity includes the contribution from bulk resistance beneath the contact pad, and so these values can be considered somewhat conservatively high, though the contribution is not large for the homogeneous samples. As should be expected, both bulk and surface resistivities are inversely proportional to the concentration of CB. Contact resistance decreases more steeply with increasing CB concentration than the bulk resistance, as shown in Table 1 where the ratio of bulk to contact resistivities is calculated for each CB/SMP blend tested.

Figure 5A:
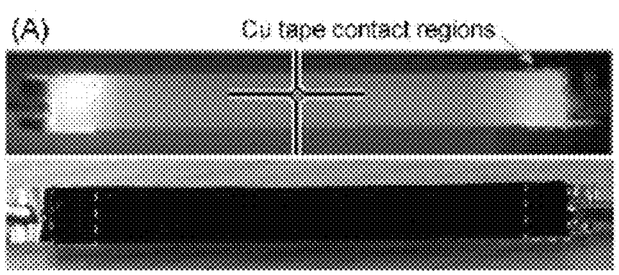
FIG. 5A show infrared and visible spectrum images of a homogeneous composite SMP strip under an applied voltage, showing excessive power dissipation at the tape contact regions. The homogeneous composite SMP strip includes a shape memory polymer doped with 15 wt. % carbon black.

To evenly heat a slender strip of CB/SMP, most of the power input is preferably dissipated within the bulk of the material. Therefore, it is desirable to have a large bulk resistivity in comparison to the contact resistivity to the Cu tape. From Table 1, it is clear that this ratio increases with CB loading, and so a higher CB loading is expected to provide better heating performance. As previously described, continuous sheets with a CB loading above about 20 wt. % may become prone to crack formation and lose the mechanical durability necessary for a flexible, reusable adhesive. FIG. 5A shows infrared (IR) and optical images of a 15 wt. % CB/SMP blend experiencing internal joule heating through Cu tape attached to the ends of its opposite face. The hot spots directly beneath the Cu tape contact regions suggest poor heating performance, with the majority of power dissipation occurring at the SMP-Cu tape interface. The tape adhesive layer appears to thin and lose contact well before the bulk of the CB/SMP strip reaches its $T_g$, as is desired for its use as an adhesive.

TABLE 1

Ratio between the experimentally determined bulk and surface resisitivities as a function of wt. % carbon black (CB).

| | Bulk to Surface Resistivity Ratio ($m^{-1}$) | |
|---|---|---|
| wt % CB | Cu Tape | Steel Clip |
| 5 | — | 10 |
| 10 | — | 18 |
| 15 | 1 | 30 |
| 20 | 6 | 57 |
| 25 | 13 | 86 |
| 30 | 14 | 105 |
| 15/30 | 42 | 76 |

Figure 5B:
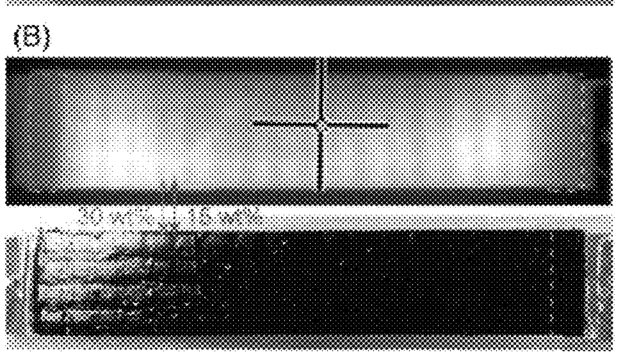
FIG. 5B shows similar images of a composite strip with isolated contact regions (including 30 wt. % CB) separating a continuous resistive region (including 15 wt. % CB), showing the power dissipation now occurs mostly between the tape contact regions within the continuous resistive region.

Reduced contact resistance may be achieved by introducing small integrated contact pads made of more highly doped (30 wt. %) CB/SMP within the moderately doped (15 wt. %) bulk CB/SMP. An initial goal of the project is to create sheets of adhesive which may be cut arbitrarily to form usable strips of varying size and orientation. Therefore, the contact pads containing 30 wt. % CB are molded as small (3.5×3.5 mm) separate islands surrounded by a continuous region containing 15 wt. % CB, referred to as the filler. The finished product is referred to as the 15/30 CB composite. This design allows power to flow relatively unimpeded through the interface between the 30 wt. % CB/SMP and Cu tape to be dissipated as heat within the connecting 15 wt % CB/SMP material. Thermal performance is shown in FIG. 5B to be far superior to the homogeneous strip shown in FIG. 5A, enabling consistent heating without threatening the integrity of the Cu tape contact. The fabrication method is shown in FIG. 6, where an additional adhesive layer, in this case comprising non-doped SMP, is included to give added bending strength, increased surface compliance (described later) and a smoother surface finish to the dry adhesive, which is fabricated in the form of a sheet. The finished sheet may be cut arbitrarily to create composite dry adhesive strips with one electrically conductive side and one adhesive side. The entire sheet comprises an SMP functional material, as depicted in FIG. 7A-7E.

The electrical properties of the 15/30 CB composite strips are characterized for comparison to the homogeneous CB/SMP values in FIG. 4A. The contact resistance measured for the composite strips using the steel clip method is much closer to the 15 wt. % CB value than expected, most likely because contact pressure from the alligator clip is applied unevenly, more heavily weighted towards the edges of the samples which comprise the 15 wt % CB/SMP material. Surprisingly, the bulk resistivity is also increased compared with the homogeneous 15 wt. % CB/SMP samples. This is most likely explained by the existence of an additional interfacial resistance between the 15 and 30 wt. % CB/SMP regions within the composite. It was observed that air bubbles were in some cases trapped within the CB/SMP mixtures during mixing and may result in small internal voids after curing. It is possible that these bubbles are especially prevalent at the interfaces between the composite regions, resulting in an increased resistance to current flow. The ratio of bulk to surface resistivities is compared to the homogeneous blends in Table 1, indicating a significantly increased ratio particularly in the case of the Cu tape contact, which as previously stated is a desirable quality for bulk heating.

Treating the 15/30 CB composite as a repeating pattern of parallel and sequential resistors, a rough estimate of the expected effective bulk resistivity may be calculated using the homogeneous CB/SMP sample data. Likewise, an effective contact resistivity may be estimated from the homogeneous sample data. These calculated estimates are provided in Table 2 along with the corresponding experimentally determined values. The calculated values assume simple, 1D current flow, and so it is unsurprising that the experimental values are greater. The significant increase over the calculated values again indicates additional interfacial resistances within the composite material, which would affect the data used to calculate contact resistivity as well as the bulk resistivity.

TABLE 2

Comparison of experimentally determined 15/30 CB composite resistivities to estimates calculated from homogeneous sample data.

| Material Property | Calculated | Experimental |
|---|---|---|
| Bulk Resistivity (Ωm) | 0.089 | 0.396 |
| Contact Resistivity ($\Omega m^2$) | 0.0040 | 0.0094 |

Figure 8A:
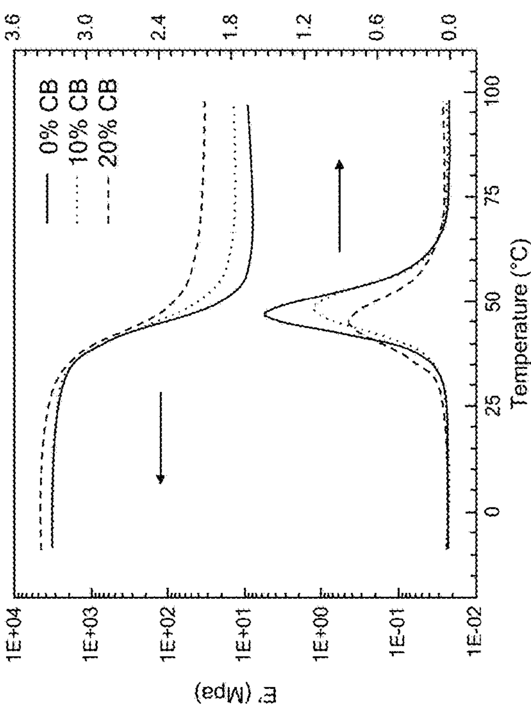
FIG. 8A shows dynamic mechanical analysis curves for shape memory polymer composites including various amounts of carbon black.

In addition to conferring electrical conductivity, adding CB to polymers may affect the mechanical properties, such as storage modulus and hardness. Dynamic mechanical analysis measurements of 10 and 20 wt. % CB/SMP blends are compared with a non-doped control sample in FIG. 8A. Storage modulus (E') is shown to generally increase with increasing CB loading, particularly when above the material's $T_g$ around 40° C. Since the increase in compliance above $T_g$ is a fundamental feature for the operation of our adhesive, this increase in E' above $T_g$ may be viewed as a negative consequence of the added CB. However, the addition of a non-doped SMP layer as the adhesive layer as shown in FIG. 4 negates this potential problem. The tan 5 curves provide additional assurance that the $T_g$ undergoes only slight variation due to the addition of CB into the SMP.

Figure 8B:
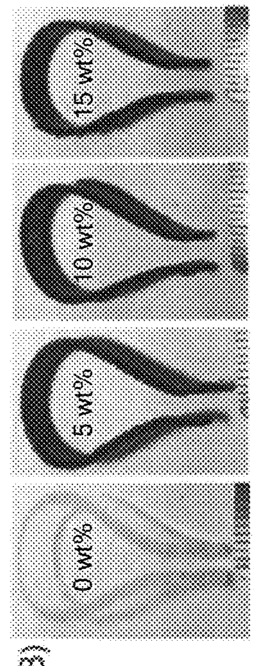
FIGS. 8B-8C show that the shape fixing and shape recovery properties of the shape memory polymer composites are minimally affected by carbon doping, demonstrated using initially straight composite strips.
Figure 8C:
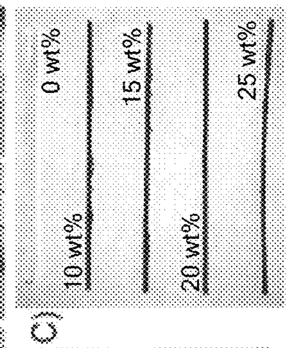
Figures 9A, 9B, 9C, 9D, 9E, 9F:
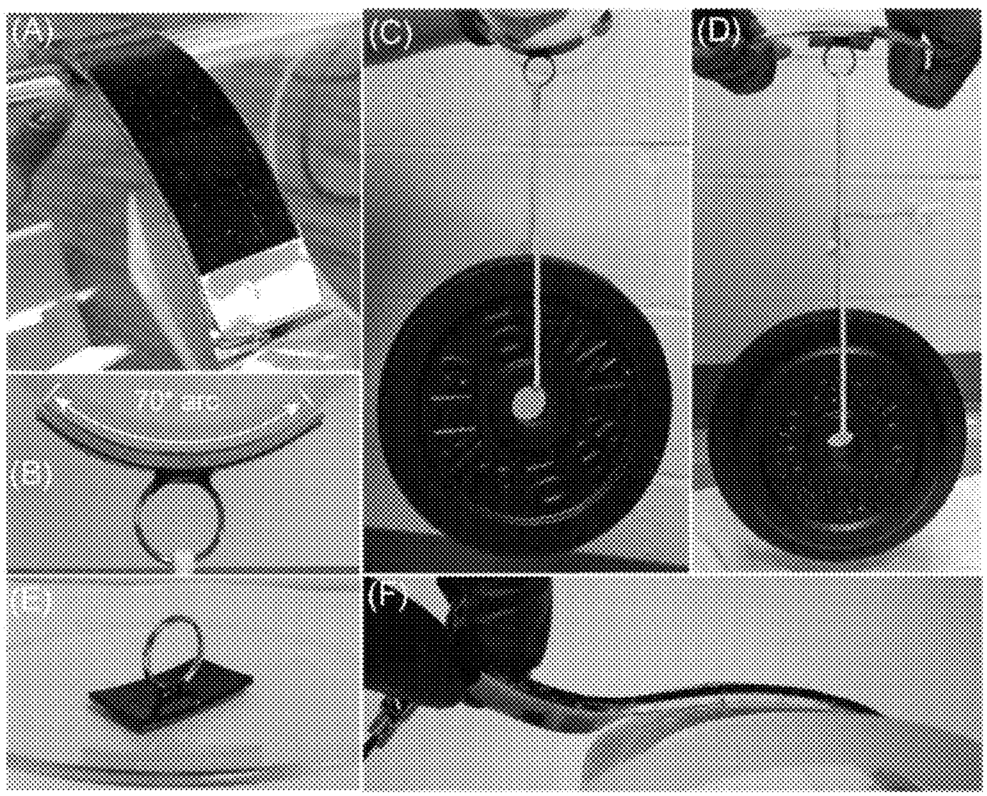
FIGS. 9A-9B show a composite dry adhesive in the form of a strip that is internally heated and then cooled to reversibly bond to a curved glass surface covering a 70 degree arc.
FIGS. 9C-9E show the bonded composite dry adhesive supporting 10- and 15-lb weights.
FIG. 9F shows removal of the composite dry adhesive heating above $T_g$ and peeling from the curved glass surface.

Another property of significant interest is whether the shape fixity and recovery of the non-doped SMP are maintained with added CB. Several initially-straight bars of varying CB/SMP blends are shown in FIG. 8B, bent and fixed into a horse-shoe shape with a loaded separation of ~1.5 mm. Upon unloading, this gap changes only a trivial amount up to a CB loading of 25 wt. %, the highest loading tested, indicating that CB loading does not significantly impact the SMP's excellent shape fixity. Upon reheating, FIG. 8C indicates similarly excellent shape recovery of each tested sample, with perhaps only a slight bend remaining in the 25 wt. % CB/SMP.

The SMP formulation used for the dry adhesive system has been previously shown to demonstrate excellent adhesive performance to smooth glass surfaces (e.g., as described in U.S. patent application Ser. No. 14/732,143, filed Jun. 5, 2015, which was incorporated by reference above). In that work, test samples with interfacial areas of 0.32 $cm^2$ were externally heated and exposed to a preload of about 40 $N/cm^2$ during bonding to generate a maximum adhesion of approximately 200 $N/cm^2$. To compare the composite dry adhesive described herein with the previous results, adhesive tests were performed using a similar preload for 55×5 mm strips (2.75 $cm^2$), heated by 2 W of internal joule heating using a 60 V power source. The CB/SMP test strips were fabricated in a U-shape with smooth, flat glass as the test substrate. The resulting adhesion averaged approximately 30 $N/cm^2$. The reduction in adhesion strength as compared to the previous work is most likely primarily due to thermal contraction increasing interfacial stresses as lateral dimensions of the adhesive increase. Over the usual range of bonding temperatures the CB/SMP adhesive expands and contracts on the order of 1% due its large thermal expansion coefficient on the order of 200 μm/mK. It was observed during loading that failure of the SMP-substrate interface occurs suddenly, analogous to brittle fracture. The role of thermal contraction is further indicated by the occurrence of spontaneous fracture in large samples (cm scale) even in the absence of load if the difference between bonding temperature and ambient temperature is too great. For this reason, bonding temperatures are preferably limited to 75° C. or less, compared with the previous work which used a standard of 90° C. for bonding temperature. It is a general trend that adhesion for the selected SMP increases with temperature; therefore, reduced bonding temperature is likely a secondary cause for the lower-than-expected adhesion. Surface patterning to promote crack trapping may help to alleviate the issue of catastrophic failure due to localized interfacial stresses. The stresses may be further reduced by adding a less rigid layer as the adhesive interface in place of the SMP. As the bulk SMP contracts, the more compliant surface material may deform more easily to reduce the buildup of interfacial stresses.

The adhesive performance of an exemplary finished CB/SMP composite dry adhesive is demonstrated in FIGS. 9A-9F on curved surfaces. First, a CB/SMP strip 15 mm wide by 65 mm long is heated using a 70 V power supply with Cu tape forming the electrical contacts on opposing ends. The now-compliant strip is pressed using finger pressure to a 4.25 inch diameter clean glass cylinder, covering a 70° arc. The pressure is maintained as the power supply is turned off, resulting in a strong, rigid bond. A 10 lb weight is supported by the strip, indicating an adhesive strength in excess of 4.6 $N/cm^2$. It is believed that the reduction in adhesion compared with the flat CB/SMP strip tests is due largely to the greatly reduced preload applied during bonding. It was observed after bonding that some areas were not in proper contact after cooling, partly from trapped air pockets and partly from thermal contraction as explained above. Testing the adhesion of the strip necessitated choosing a pick point; in this case, the weight was applied to the center of the strip, creating an additional localized concentration of stress on the interface, thus reducing the apparent adhesion. This was likewise the case for the concave surface demonstration, for which a 25 mm wide by 45 mm long CB/SMP strip was bonded using finger pressure to the inside of a watch glass. This configuration yielded a failure strength exceeding 5.9 $N/cm^2$; again, less than the result from the smaller and higher-preload flat strip tests. Surface patterns designed to promote crack trapping could also effectively alleviate the issues of air entrapment by creating pathways for the air to escape during bonding. Increased preload during bonding or the use of a softer and/or stickier adhesive layer in place of or in addition to the non-doped SMP might also be expected to increase performance by helping to reduce thermally-induced interfacial stresses and reducing the necessary preload to ensure proper surface contact. As a final demonstration in FIG. 9E, a composite SMP adhesive is gently removed from the glass by heating and peeling, thus achieving the desired adhesive reversibility.

A brief collection of representative conventional, or "wet," and dry adhesive strengths are given in Table 3. Fibrillar adhesives are typically tested in shear, since this is also typically their direction of maximum strength and reversibility. It is believed that wet adhesives are fundamentally different than dry adhesives, and should not be treated as a competitor to dry adhesive systems. A dry adhesive bond is by nature a temporary one, whereas the use of wet adhesives is usually intended as a permanent bond between two surfaces.

TABLE 3

Conventional "wet" adhesive and representative fibrillar dry adhesive strength for comparison to the composite dry adhesive of the present disclosure.

| Classification | Adhesive | Adhesive Strength ($N/cm^2$) | Substrate (s) |
|---|---|---|---|
| Wet (permanent, requires cure time) | Mussel adhesive extracts | 10-300 | Skin to skin |
| | Cyanoacrylates | 1500 | Steel to Al |
| | (super glue) | 210 | Steel to butyl |
| | 3M Epoxy | 1170-1320 (shear) | Steel to steel |
| | 2216 B/A | 900 (shear) | Plastic to plastic |
| | LOCTITE | 2300 (shear) | Glass to glass |
| | epoxy E-120HP | 150 (shear) | Acrylic to acrylic |
| Dry (reusable, reversible, no cure time) | Carbon nanotube fibers | 3-150 (shear) | Glass/plastic |
| | Polymer fibers | 0.2-15 (shear) | |
| | Gekko gecko | 10 (shear) | Acetate sheet |
| | SMP (<cm) | 200 | Glass |
| | SMP (>cm) | 5-30 | Glass |

The above examples demonstrate the feasibility of creating an electrically conductive epoxy-based SMP as a functional component in a dry adhesive system that can operate on flat or curved surfaces. The adhesive may be fabricated in sheets that can be arbitrarily cut to size and the pieces connected easily to a power source using electrically conductive tape on the surface. The composite dry adhesive may be used with only finger pressure to bond against smooth surfaces with an adhesion strength in excess of 0.1 MPa.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A composite dry adhesive comprising:

an adhesive layer comprising a shape memory polymer; and a resistive heating layer comprising a shape memory polymer composite on the adhesive layer, the shape memory polymer composite including conductive particles dispersed in a shape memory polymer matrix, wherein the conductive particles have a concentration sufficient to form a conductive path through the resistive heating layer, wherein the resistive heating layer includes one or more isolated contact regions at least partially surrounded by a continuous resistive region, the one or more isolated contact regions including the conductive particles at a first concentration and the continuous resistive region including the conductive particles at a second concentration, the first concentration being higher than the second concentration.

2. The composite dry adhesive of claim 1, wherein the first concentration is from about 25 wt. % to about 30 wt. %, and wherein the second concentration is from about 10 wt. % to about 20 wt. %.

3. The composite dry adhesive of claim 1, wherein the one or more isolated contact regions are surrounded by the continuous resistive region in a plane of the resistive heating layer.

4. The composite dry adhesive of claim 1, wherein the resistive heating layer includes from 5 to 500 of the isolated contact regions.

* * * * *